(12) United States Patent
McCaldon

(10) Patent No.: US 12,442,331 B2
(45) Date of Patent: Oct. 14, 2025

(54) HIGH SHEAR FUEL DISTRIBUTOR

(71) Applicant: Pratt & Whitney Canada Corp., Longueuil (CA)

(72) Inventor: Kian McCaldon, Orangeville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 182 days.

(21) Appl. No.: 18/104,912

(22) Filed: Feb. 2, 2023

(65) Prior Publication Data

US 2024/0263581 A1 Aug. 8, 2024

(51) Int. Cl.
| | |
|---|---|
| F23R 3/12 | (2006.01) |
| F02C 3/14 | (2006.01) |
| F02C 7/04 | (2006.01) |
| F02C 7/22 | (2006.01) |
| F02C 7/236 | (2006.01) |

(52) U.S. Cl.
CPC .................. *F02C 7/04* (2013.01); *F02C 3/14* (2013.01); *F02C 7/222* (2013.01); *F02C 7/2365* (2013.01)

(58) Field of Classification Search
CPC ........... F02C 7/222; F02C 7/2365; F23R 3/12
See application file for complete search history.

(56) References Cited

U.S. PATENT DOCUMENTS

| | | |
|---|---|---|
| 4,534,166 A | 8/1985 | Helm et al. |
| 5,197,290 A | 3/1993 | Lee et al. |
| 5,373,693 A | 12/1994 | Zarzalis et al. |
| 5,394,688 A | 3/1995 | Amos |
| 5,490,378 A | 2/1996 | Berger et al. |
| 5,675,971 A | 10/1997 | Angel et al. |
| 6,199,367 B1 | 3/2001 | Howell |
| 7,832,212 B2 | 11/2010 | Bunker |
| 7,870,736 B2 | 1/2011 | Homitz et al. |
| 8,266,911 B2 | 9/2012 | Evulet |
| 8,413,445 B2 | 4/2013 | Poyyapakkam |
| 8,539,773 B2 | 9/2013 | Ziminsky et al. |
| 8,661,779 B2 | 3/2014 | Laster et al. |

(Continued)

FOREIGN PATENT DOCUMENTS

| | | |
|---|---|---|
| CN | 101220955 | 7/2008 |
| CN | 206113000 | 4/2017 |

(Continued)

OTHER PUBLICATIONS

European Search Report for European Application No. 23220364.6 mailed Apr. 22, 2024.

*Primary Examiner* — Brian M O'Hara
(74) *Attorney, Agent, or Firm* — Carlson, Gaskey & Olds, P.C.

(57) ABSTRACT

A fuel mixture distributor for a turbine engine assembly includes a mixing chamber that is disposed about a central axis from a back wall to an outlet of a combustion chamber, and a fuel inlet that extends into the mixing chamber along the central axis. The fuel inlet includes a plurality of fuel openings that are angled relative to the central axis and a first air inlet that encircles the mixing chamber and is spaced apart from the fuel inlet. The first air inlet includes a plurality of first air openings that introduce a first air flow into the mixing chamber. A second air inlet introduces a secondary air flow that is axially forward of the fuel inlet and the first air inlet and proximate to the outlet of the mixing chamber.

20 Claims, 5 Drawing Sheets

(56) References Cited

U.S. PATENT DOCUMENTS

| | | | |
|---|---|---|---|
| 8,850,819 B2 * | 10/2014 | Cheung | F23R 3/286 60/737 |
| 8,893,500 B2 | 11/2014 | Oskam | |
| 9,771,869 B2 | 9/2017 | Li et al. | |
| 9,869,251 B2 * | 1/2018 | Chen | F23R 3/12 |
| 9,976,522 B2 | 5/2018 | Patel et al. | |
| 10,082,294 B2 | 9/2018 | Laster et al. | |
| 10,184,403 B2 * | 1/2019 | McCaldon | F23R 3/12 |
| 10,267,522 B2 | 4/2019 | Ciani et al. | |
| 10,502,425 B2 | 12/2019 | Boardman et al. | |
| 10,704,786 B2 | 7/2020 | Laster et al. | |
| 10,865,989 B2 | 12/2020 | Sadasivuni | |
| 10,941,940 B2 | 3/2021 | Bulat et al. | |
| 10,989,410 B2 * | 4/2021 | Chen | F23R 3/06 |
| 11,067,280 B2 | 7/2021 | Boardman et al. | |
| 11,920,793 B1 * | 3/2024 | Strzepek | F23R 3/286 |
| 2010/0139281 A1 | 6/2010 | Callas et al. | |
| 2010/0162713 A1 | 7/2010 | Li et al. | |
| 2011/0185703 A1 | 8/2011 | Dodo et al. | |
| 2011/0314824 A1 | 12/2011 | Cheung | |
| 2012/0227411 A1 | 9/2012 | Carroni et al. | |
| 2014/0123655 A1 | 5/2014 | Cheung | |
| 2017/0227224 A1 | 8/2017 | Oskam et al. | |
| 2017/0307210 A1 | 10/2017 | Hirano et al. | |
| 2021/0172413 A1 | 6/2021 | Snyder | |
| 2021/0172604 A1 | 6/2021 | Locke et al. | |

FOREIGN PATENT DOCUMENTS

| | | |
|---|---|---|
| EP | 1923637 | 5/2008 |
| JP | 2013108667 | 6/2013 |
| JP | 5538113 | 7/2014 |
| JP | 5926635 | 5/2016 |
| WO | 2016051756 | 4/2016 |
| WO | 2020259919 | 12/2020 |

* cited by examiner

HIGH SHEAR FUEL DISTRIBUTOR

BACKGROUND

A gas turbine engine ignites a mixture of compressed air with fuel in a combustor to generate a high temperature exhaust gas flow. The exhaust gas flow expands through a turbine to generate shaft power that is utilized to drive a propulsor and engine accessory components. Conventional hydrocarbon fuels are introduced into a combustor in a liquid form. The liquid fuel is atomized to induce mixing with the compressed airflow. Alternate, non-carbon based fuels such as hydrogen perform differently during combustion and therefore unconventional combustor/fuel injection arrangements are necessary to ensure a stable combustion process which delivers the desired turbine inlet temperature pattern, starting and durability while minimizing emissions. At the same time, in order to convert an existing engine design to use alternate fuels it is highly desirable to maintain the existing combustor dimensions. This is particularly important in aviation gas turbine engines, as increases in engine size or weight will have consequences for aircraft design Aircraft engine manufacturers continue to seek further improvements to engine performance including improvements to durability, emissions and propulsive efficiencies.

SUMMARY

A fuel mixture distributor for a turbine engine assembly according to one example disclosed embodiment includes, among other possible things, a mixing chamber that is disposed about a central axis from a back wall to an outlet of a combustion chamber, and a fuel inlet that extends into the mixing chamber along the central axis. The fuel inlet includes a plurality of fuel openings that are angled relative to the central axis. The fuel mixture distributor further includes a first air inlet that encircles the mixing chamber and is spaced apart from the fuel inlet. The first air inlet includes a plurality of first air openings that introduce a first air flow into the mixing chamber. The fuel mixture distributor further includes a second air inlet that is disposed forward of the fuel inlet and the first air inlet. The second air inlet introduces a secondary air flow that is axially forward of the fuel inlet and the first air inlet and proximate to the outlet of the mixing chamber.

A combustor assembly for a turbine engine according to another disclosed example embodiment includes, among other possible things, a combustor wall that defines a combustion chamber, and a fuel distributor. The fuel distributor includes a mixing chamber that is disposed about a central axis from a back wall to an outlet to the combustion chamber. A fuel inlet extends into the mixing chamber along the central axis. The fuel inlet includes a plurality of fuel openings angled relative to the central axis. A first air inlet includes a plurality of first air openings spaced circumferentially apart around the mixing chamber and spaced apart from the fuel inlet, and a second air inlet is disposed forward of the fuel openings and the first air inlet.

A turbine engine assembly according to another disclosed example embodiment includes, among other possible things, a compressor section that is in flow series with a turbine section, a combustor assembly including a combustion chamber that is disposed between the compressor section and the turbine section, and a fuel distributor for introducing a fuel air mixture into the combustion chamber. The fuel distributor includes a mixing chamber that is disposed about a central axis from a back wall to an outlet to the combustion chamber, a fuel inlet that extends into the mixing chamber along the central axis, the fuel inlet includes a plurality of fuel openings that are angled relative to the central axis, a first air inlet includes a plurality of first air openings that are spaced circumferentially apart around the mixing chamber and spaced apart from the fuel inlet, and a second air inlet that is disposed forward of the fuel openings and the first air openings. The turbine engine assembly further includes a fuel system that communicates a fuel in a gaseous phase to the fuel mixture distributor.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
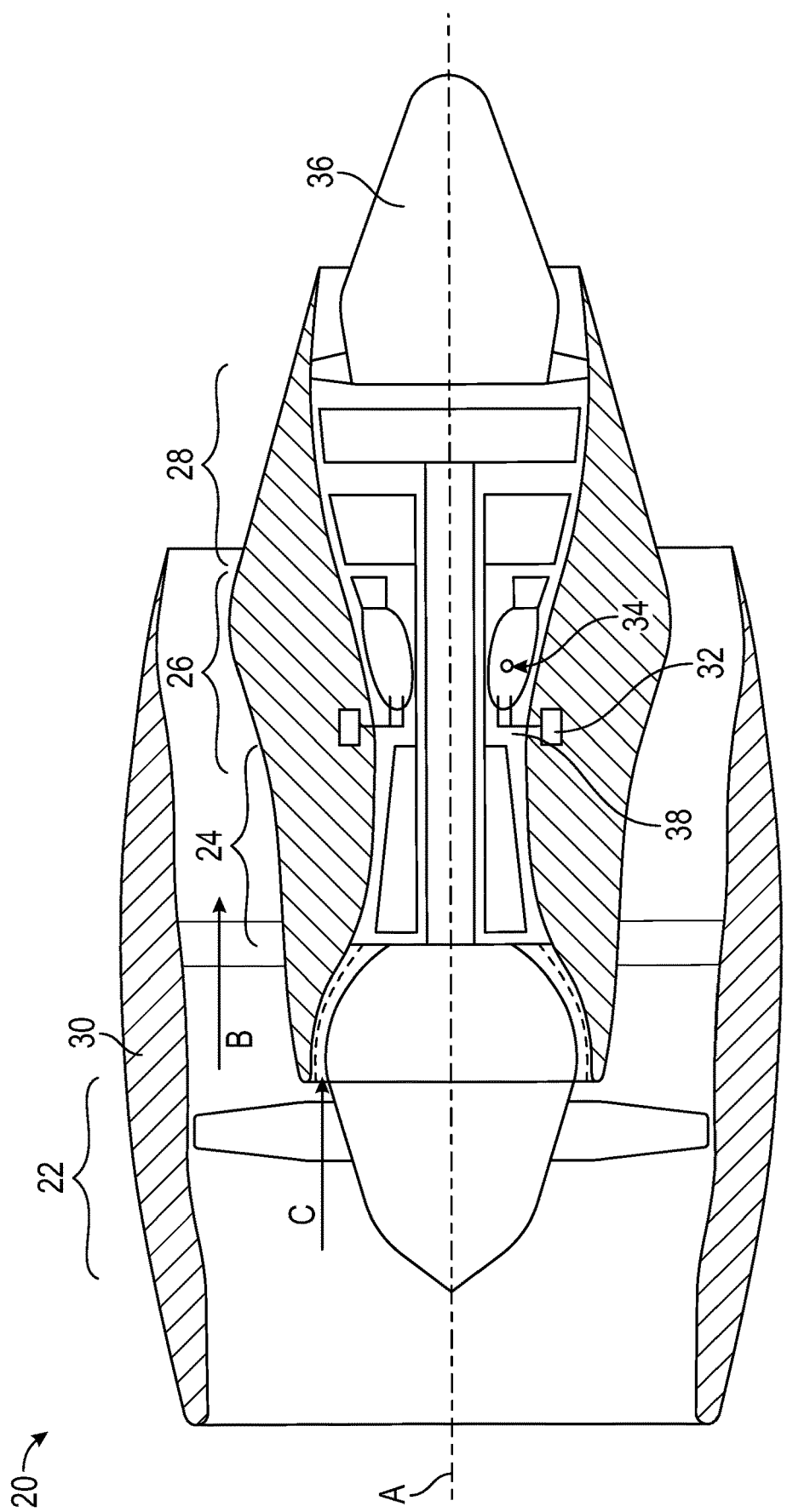
FIG. 1 is a schematic view of an example turbine engine including a fuel distributor for introducing a fuel air mixture into a combustion chamber

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and burnt to generate an exhaust gas flow that expands through the turbine section 28 and is exhausted through exhaust nozzle 36. An igniter 34 is provided in the combustor section 26 to aid ignition during starting operations.

Although depicted as a turbofan turbine engine in the disclosed non-limiting embodiment, it should be understood that the concepts described herein are not limited to use with turbofans as the teachings may be applied to other types of gas turbine engines. As one example, rather than having the propulsor be an enclosed fan, the propulsor may be an open propeller.

Conventional hydrocarbon fuels are introduced into a combustor in a liquid form and are atomized to induce mixing with air. Alternative, non-carbon based fuels perform differently during combustion and therefore unconventional combustor/fuel injector arrangements are necessary to ensure a stable combustion process which delivers the desired turbine inlet temperature pattern, starting and durability while minimizing emissions. The disclosed example engine is designed to use gaseous hydrogen fuel. While it is possible to introduce hydrogen into the combustor in liquid form, hydrogen is more commonly introduced in a gas phase in turbine combustors in order to maintain stable combustion across the wide range of operating conditions required for an aviation gas turbine. As a gaseous fuel, hydrogen has a wider range of flammability and a higher flame velocity than conventional liquid fuels used in gas turbine engines, this results in changes in the flame pattern within the combustor which may influence the engine durability, starting, or emissions. Accordingly, the example combustor section 26 includes features tailored to operation using hydrogen fuel including a fuel distributor 38 that induces mixing of the gaseous fuel and air to provide efficient combustion.

Figure 2:
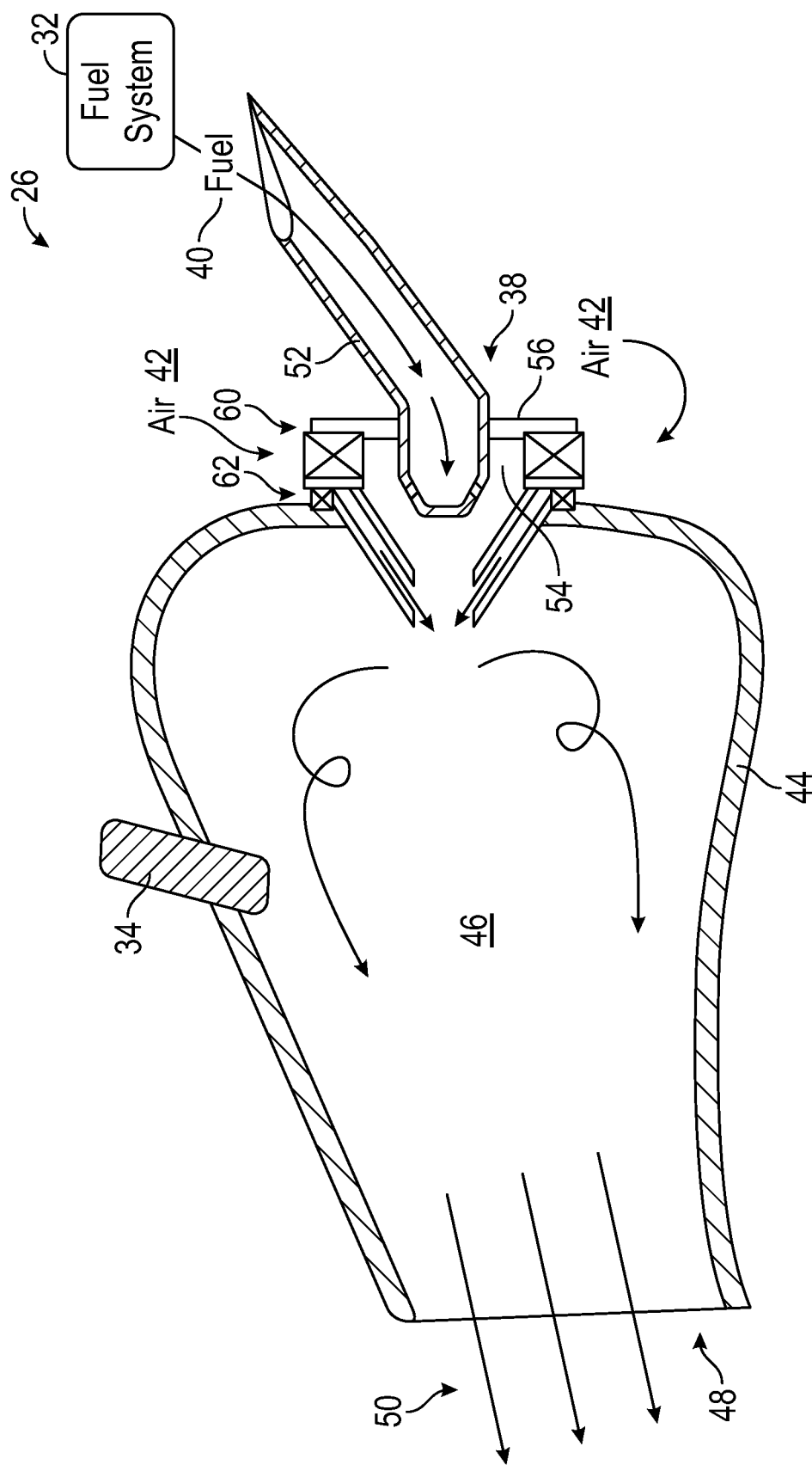
FIG. 2 is a schematic view of an example combustor assembly embodiment.

Referring to FIG. 2, an example combustor assembly 26 is schematically shown and includes walls 44 that define a combustion chamber 46. The combustion chamber 46 supports an igniter 34 and includes an exit 48 for combustion gas flow 50. A fuel distributor 38 is provided opposite the exit 48 for introducing an air fuel mixture. The fuel distributor 38 provides for mixing of a gaseous fuel flow 40 from the fuel system 32 with an airflow 42 prior to entering the combustion chamber 46. The air and fuel flows are tailored in conjunction with the combustor holes to provide stable combustion and minimized emissions across the range of engine operating conditions, as well as good starting when ignited by an igniter 34. In one disclosed example, the fuel system 32 provides a gaseous hydrogen fuel flow through a fuel passage 52 into a mixing chamber 54. In the mixing chamber 54, the fuel flow 40 is mixed with air 42. The example fuel distributor includes a first air inlet 60 that introduces a first airflow into the mixing chamber and second air inlet 62 that introduces a second airflow.

Figure 3:
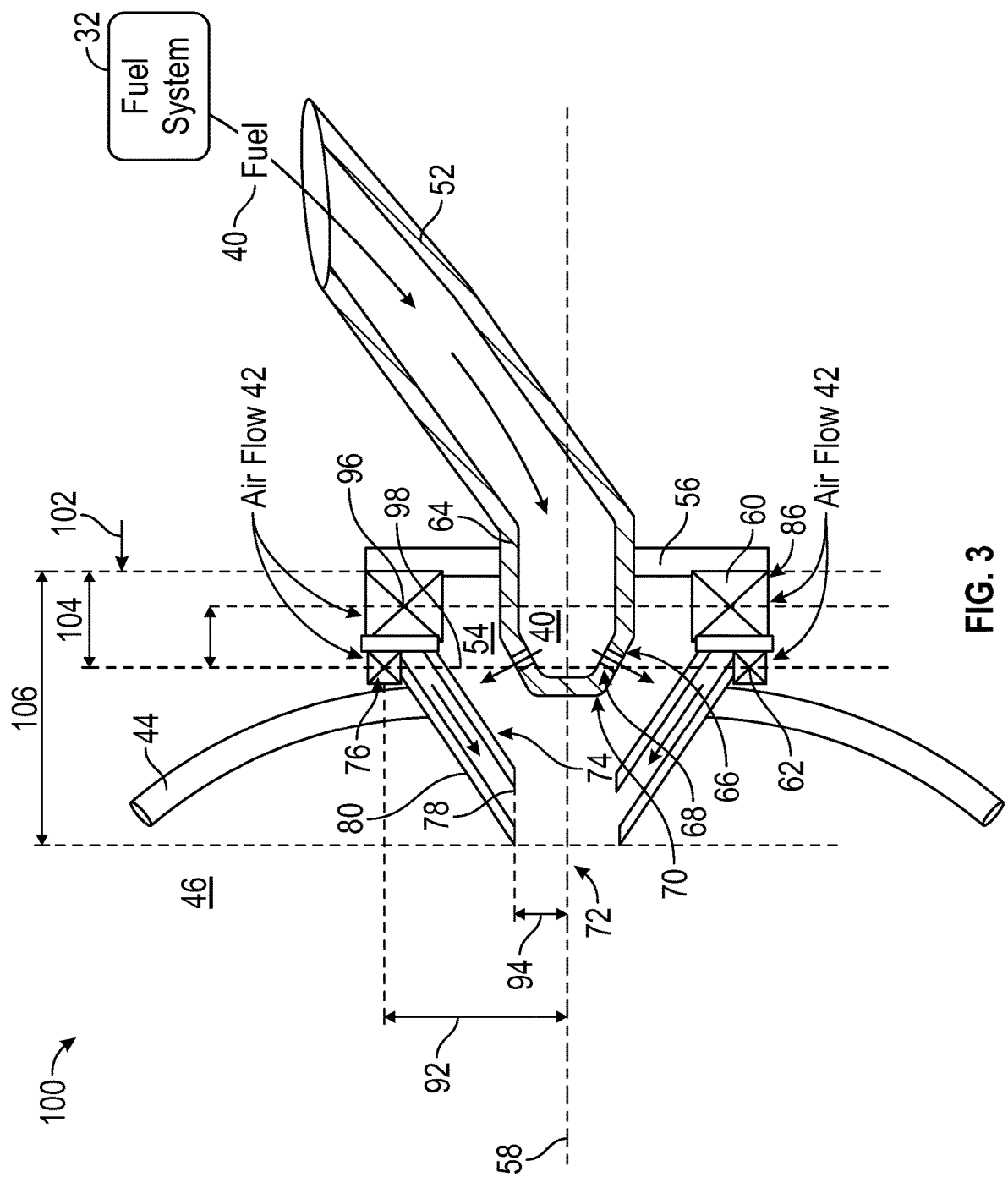
FIG. 3 is an enlarged schematic view of an example fuel distributor embodiment.

Referring to FIG. 3, with continued reference to FIG. 2, the mixing chamber 54 is disposed along a central axis 58 between a back wall 56 and an outlet 72. An inlet end 64 of the fuel passage 52 extends through the back wall 56 and into the mixing chamber 54. The inlet end 64 includes a closed end face 70 and an angled side surface 66. The side surface 66 is a continues surface about the central axis 58. Fuel openings 68 are spaced circumferentially about the axis 58 through the side surface 66. The angle of the side surface 66 corresponds to an angle at which the fuel openings 68 are arranged relative to the central axis 58

The fuel openings 68 are disposed axially forward of the first air inlet 60. Accordingly, air flow from the first inlet 60 is introduced upstream of the fuel openings 68. A second air inlet 62 is disposed forward and downstream of the first air inlet 60 and communicates a second airflow through a conduit 80 to a location proximate the outlet 72 to the combustion chamber 46. The second air inlet 62 includes an inlet end 76 spaced radially a distance 92 from the central axis 58. An outlet end 78 is spaced radially a distance 94 from the central axis 58 that is less than the distance 92. The conduit 80 slants inwardly toward the central axis from the inlet end 76 to define a generally converging inner surface 74 of the mixing chamber 54 in the direction toward the outlet 72.

The first airflow through the first air inlet 60 is introduced into the mixing chamber 54 aft and upstream of the fuel openings 68. The first air inlet 60 provides a swirling flow about the inlet end 64 as the flow moves forward toward the outlet 72. Fuel flow 40 introduced through the fuel passages 68 is angled outwardly and forward toward the outlet 72. The swirling air flow from the first air inlet 60 combines with the forward and outward flow direction of fuel through the fuel openings 68 to induce mixing to form a desired air fuel mixture. As the fuel air mixture proceeds through the mixing chamber 54 toward the outlet 72, an additional amount of air flow is introduced through the second air inlet 62. The inward angled conduit 80 of the second air inlet 62 provides additional momentum for the fuel air m mixture into the combustion chamber 46 as well as additional air flow to provide a desired stoichiometric mix of air and fuel. The converging structure of the mixing chamber 54 further provides an increase in flow momentum to propel the fuel air mixture into the combustion chamber 46.

The first air inlet 60 is disposed within a plane 96. The plane 96 is spaced axially apart from the back wall a distance 102. The fuel openings 68 are disposed in a plane 98 spaced axially apart from the back wall 56 a distance 104. The outlet end 78 of the second air inlet 62 is disposed within a plane 100 that is spaced an axial distance 106 from the back wall 56. Each of the planes 96, 98 and 100 are transverse to the central axis 58. The incremental and different spacing of the fuel and air inlets encourages a complete mixing of fuel and air. In one example embodiment, the plane 96 of the first air inlet 60 is disposed upstream of the plane 98 that includes the fuel openings 68. The plane 100 is downstream of both the planes 96 and 98 and introduces a second airflow further downstream and proximate the outlet 72.

Figure 4:
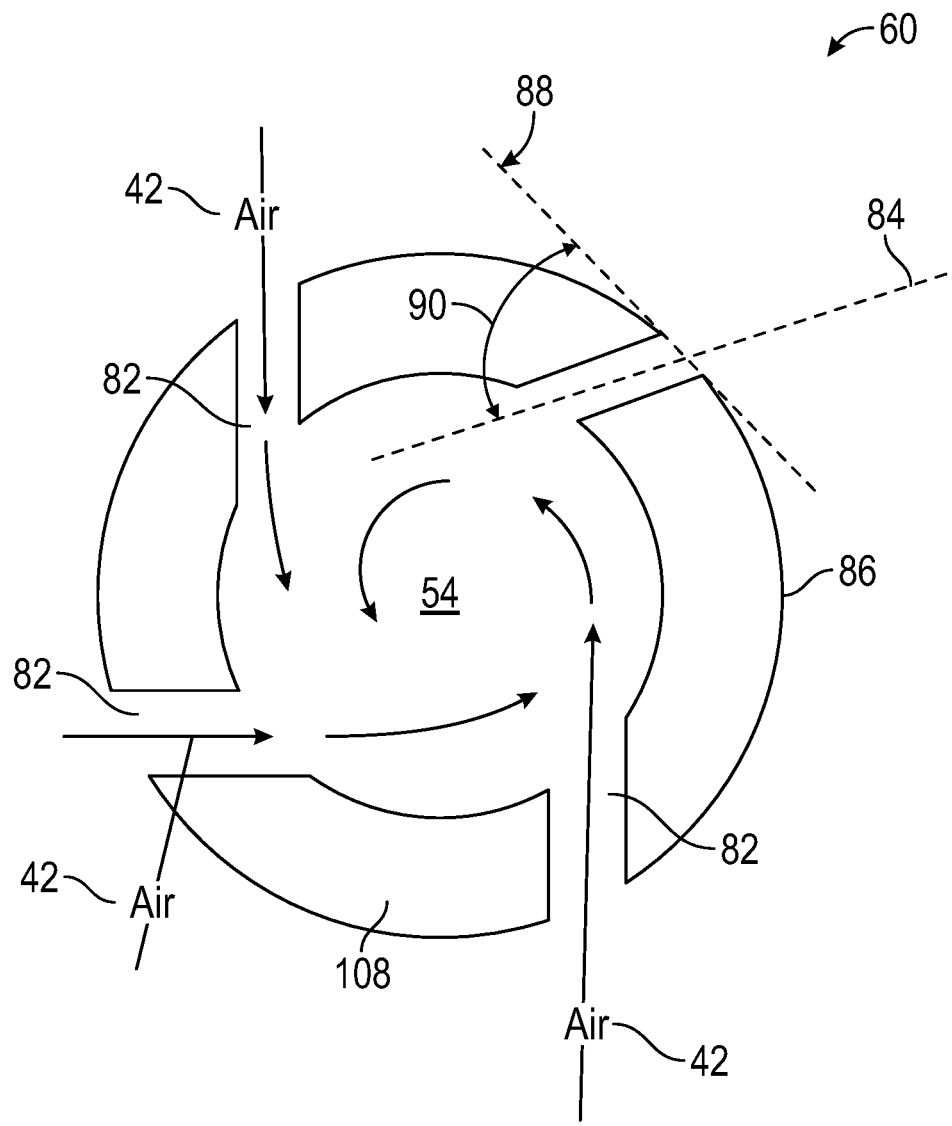
FIG. 4 is a cross-sectional view of a portion of the example fuel distributor embodiment.

Referring to FIG. 4, with continued reference to FIG. 3, the first air inlet 60 includes a plurality of air passages 82 that extend through a wall 108 about an individual passage axis 84. The passage axis 84 is disposed at an angle 90 relative to a line 88 tangent with an outer surface 86 of the wall 108. The angle 90 is a non-normal angle and provides for the airflow 42 to enter the mixing chamber 54 in a manner that induces a swirling and mixing flow.

The air passages 82 are arranged about a circumference of the wall 108 and may be of any size or shape defined to provide a desired magnitude of airflow intended to generate the swirling flow for generating a desired air fuel mixture. Moreover, although four air passages 82 are shown by way of example, any number of air passages 82 could be utilized and remain within the scope and contemplation of this disclosure.

Figure 5:
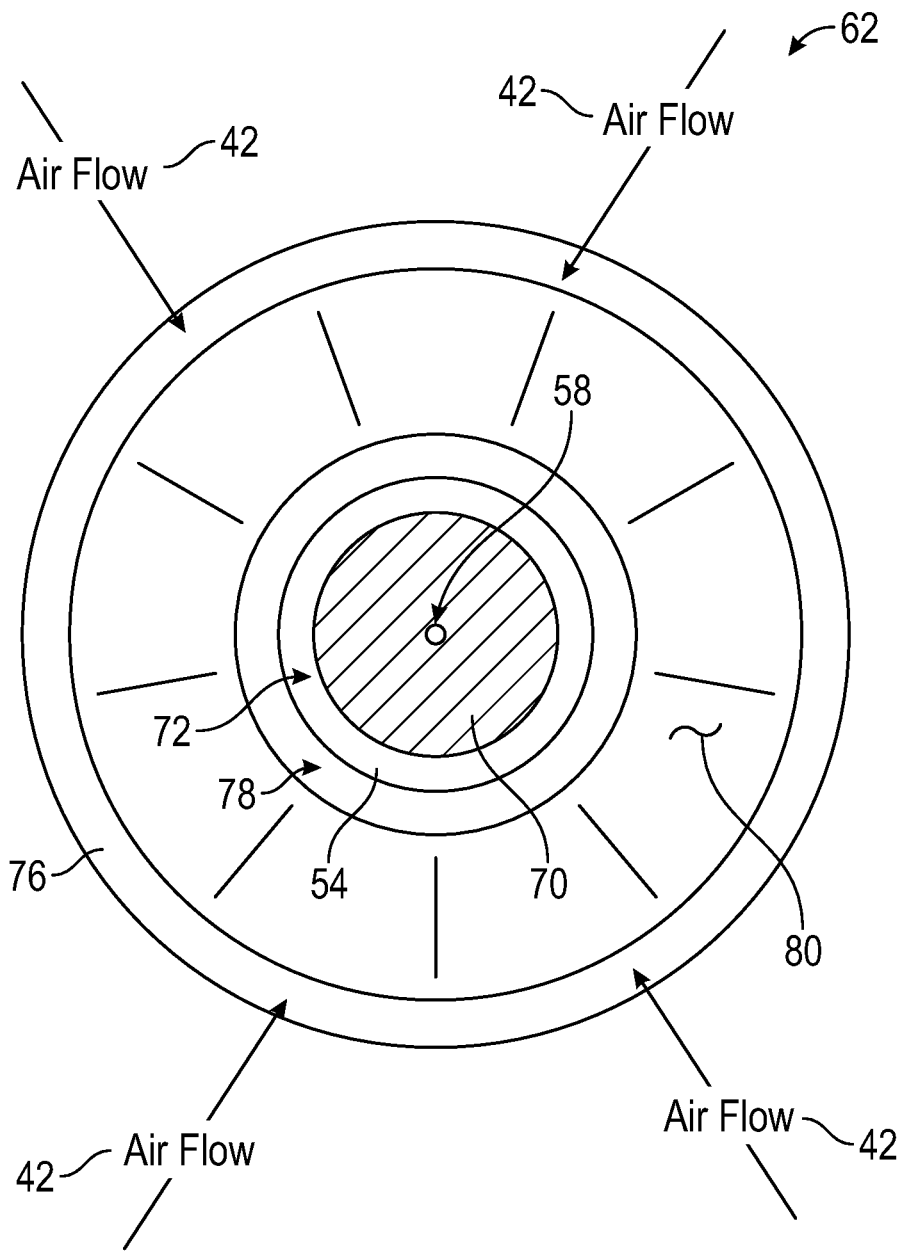
FIG. 5 is a front view of the example fuel distributor embodiment.

Referring to FIG. 5, with continued reference to FIG. 3, a front portion of the example fuel distributor 38 is shown looking from the combustor exit 48 toward the fuel distributor 38. The exit end 78 is shown as an annular opening disposed about the central axis 58. The exit end 78 is disposed about the outlet 72 of the mixing chamber 54 to introduce additional air and to propel the fuel air mixture into the combustion chamber 46. The closed end 70 of the fuel inlet 64 can be seen centered within the outlet 72. The inlet end 76 of the second air inlet 62 is also shown to indicate where air flow is directed into the conduit 80. The outer surface of the conduit 80 is shown in this view between the inlet end 76 and the outlet 78. The inlet end 76 may also be an annular opening as shown. Although the inlet end 76 and the outlet end 78 are shown as full annular openings, the openings may be segmented or otherwise divided. Moreover, the openings in the inlet end 76 and the outlet 78 may be a provided a plurality of massages spaced circumferentially apart about the central axis 58.

The example fuel distributor 38 is operated at a stochiometric range of between 0.5 and 2. The size and number of first and second air inlets 60, 62, the size and shape of the mixing chamber 54 and fuel openings 68 may be adjusted to provide the desired stoichiometric mixture of fuel and air communicated into the combustion chamber 46.

The example disclosed fuel distributor 38 provides mixing of air and gaseous fuel prior to being introduced into the combustion chamber 46. Additionally, the example fuel distributor 38 induces a swirling flow in the fuel air mixture to aid in distribution upon entering the combustion chamber 46 to improve combustion operation and efficiency.

A fuel mixture distributor 38 for a turbine engine assembly according to one example disclosed embodiment includes, among other possible things, a mixing chamber 54 that is disposed about a central axis 58 from a back wall 56 to an outlet 72 of a combustion chamber 46, and a fuel inlet 64 that extends into the mixing chamber 54 along the central axis 58. The fuel inlet 64 includes a plurality of fuel openings 68 that are angled relative to the central axis 58. The fuel mixture distributor 38 further includes a first air inlet 60 that encircles the mixing chamber 54 and is spaced apart from the fuel inlet 64. The first air inlet 60 includes a plurality of first air openings 82 that introduce a first air flow 42 into the mixing chamber 54. The fuel mixture distributor 38 further includes a second air inlet 62 that is disposed forward of the fuel inlet 64 and the first air inlet 60. The second air inlet 62 introduces a secondary air flow that is axially forward of the fuel inlet 64 and the first air inlet 60 and proximate to the outlet 72 of the mixing chamber 54.

In a further embodiment of the foregoing, the fuel inlet 64 includes an angled inlet surface 66 and a closed end 70 and the plurality of fuel openings 68 extend through the angled inlet surface 66.

In a further embodiment of any of the foregoing, the first air openings 82 are disposed at a first axial distance from the back wall 56 and the fuel openings 68 are disposed at a second axial distance from the back wall 56. The second axial distance is greater than the first axial distance.

In a further embodiment of any of the foregoing, the second air inlet 62 is spaced a third axial distance from the back wall 56. The third axial distance is greater than the first axial distance and the second axial distance.

In a further embodiment of any of the foregoing, the first air openings 82 are disposed at an angle relative to an inner surface of the mixing chamber 54 such that airflow through the first air openings introduces a swirling airflow component within the mixing chamber 54.

In a further embodiment of any of the foregoing, the second air inlet 62 includes an air conduit 80 that extends between an inlet end 76 spaced a radial distance from an outlet end 78.

In a further embodiment of any of the foregoing, the inlet end 76 is spaced a radial distance from the central axis 58 greater than a radial distance of the outlet end 78.

In a further embodiment of any of the foregoing, the air conduit 80 is annular about the central axis 58.

In a further embodiment of any of the foregoing, the mixing chamber 54 converges from the first air inlet 60 in a direction toward the outlet 72.

A combustor assembly 26 for a turbine engine according to another exemplary embodiment of this disclosure, among other possible things includes a combustor wall 44 that defines a combustion chamber 46, and a fuel distributor 38. The fuel distributor 38 includes a mixing chamber 54 that is disposed about a central axis 58 from a back wall 56 to an outlet 72 to the combustion chamber 46. A fuel inlet 64 extends into the mixing chamber 54 along the central axis 58. The fuel inlet includes a plurality of fuel openings that are angled relative to the central axis. A first air inlet 60 includes a plurality of first air openings 82 that are spaced circumferentially apart around the mixing chamber 54 and spaced apart from the fuel inlet 64, and a second air inlet 62 is disposed forward of the fuel openings 68 and the first air inlet 60.

In a further embodiment of the foregoing, the plurality of first air openings 82 are each angled relative to an inner surface of the mixing chamber 54 such that airflow through the first air openings 82 introduces a swirling airflow component within the mixing chamber 54.

In a further embodiment of any of the foregoing, the second air inlet 62 includes an air conduit 80 that extends between an inlet end 64 and an outlet end 78. The inlet end 64 is spaced a radial distance from the central axis 58 that is greater than a radial distance from the central axis 58 to the outlet end 78.

In a further embodiment of any of the foregoing, the fuel inlet 64 includes an angled inlet surface 66 and a closed end 70 and the plurality of fuel openings 68 extend through the angled inlet surface 66.

In a further embodiment of any of the foregoing, the first air openings 82 are disposed at a first axial distance from the back wall 56, the fuel openings 68 are disposed at a second axial distance from the back wall 56, and the second air inlet 62 is spaced a third axial distance from the back wall 56. The second axial distance is greater than the first axial distance and the third axial distance greater than either of the first axial distance or the second axial distance.

In a further embodiment of any of the foregoing, the mixing chamber 54 converges from the first air inlet 60 in a direction toward the outlet 72.

A turbine engine assembly 20 according to another disclosed example embodiment includes, among other possible things, a compressor section 24 that is in flow series with a turbine section 28, a combustor assembly 26 including a combustion chamber 46 that is disposed between the compressor section 24 and the turbine section 28, and a fuel distributor 38 for introducing a fuel air mixture into the combustion chamber 46. The fuel distributor 38 includes a mixing chamber 54 that is disposed about a central axis 58 from a back wall 56 to an outlet 78 to the combustion chamber 46, a fuel inlet 64 that extends into the mixing chamber 54 along the central axis 58, the fuel inlet 64 includes a plurality of fuel openings 68 that are angled relative to the central axis 58, a first air inlet 60 includes a plurality of first air openings 82 that are spaced circumferentially apart around the mixing chamber 54 and spaced apart from the fuel inlet 64, and a second air inlet 62 that is disposed forward of the fuel openings 68 and the first air openings 82. The turbine engine assembly 20 further includes a fuel system 32 that communicates a fuel in a gaseous phase to the fuel mixture distributor 38.

In a further embodiment of the foregoing, the plurality of first air openings 82 are each angled relative to an inner surface of the mixing chamber 54 such that airflow through the first air openings 82 introduces a swirling airflow component within the mixing chamber 54.

In a further embodiment of any of the foregoing, the second air inlet 62 includes an air conduit 80 that extends between an inlet end 76 and an outlet end 78. The inlet end 76 is spaced a radial distance from the central axis 58 that is greater than a radial distance from the central axis 58 of the outlet end 78.

In a further embodiment of any of the foregoing, the fuel inlet 64 includes an angled inlet surface 66 and a closed end 70 and the plurality of fuel openings 68 extend through the angled inlet surface 66.

In a further embodiment of any of the foregoing, the mixing chamber 54 converges from the first air inlet 60 in a direction toward the exit opening 72.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel mixture distributor for a turbine engine assembly comprising:
a mixing chamber disposed about a central axis from a back wall to an outlet of a combustion chamber;
a fuel inlet extending into the mixing chamber along the central axis, the fuel inlet including a plurality of fuel openings angled relative to the central axis;
a first air inlet encircling the mixing chamber and spaced apart from the fuel inlet, the first air inlet including a plurality of first air openings introducing a first air flow into the mixing chamber; and
a second air inlet disposed forward of the fuel inlet and the first air inlet, the second air inlet introducing a secondary air flow axially forward of the fuel inlet and the first air inlet and proximate to the outlet of the mixing chamber, wherein the second air inlet includes an air conduit that extends between an inlet end spaced a radial distance from an outlet end, wherein the outlet end comprises an opening that is disposed parallel to the central axis to open radially inward into the mixing chamber.

2. The fuel mixture distributor as recited in claim 1, wherein the fuel inlet includes an angled inlet surface and a closed end and the plurality of fuel openings extend through the angled inlet surface.

3. The fuel mixture distributor as recited in claim 2, wherein the first air openings are disposed at a first axial distance from the back wall and the fuel openings are disposed at a second axial distance from the back wall, the second axial distance is greater than the first axial distance.

4. The fuel mixture distributor as recited in claim 3, wherein the second air inlet is spaced a third axial distance from the back wall, the third axial distance greater than the first axial distance and the second axial distance.

5. The fuel mixture distributor as recited in claim 4 wherein the first air openings are disposed at an angle relative to an inner surface of the mixing chamber such that airflow through the first air openings introduces a swirling airflow component within the mixing chamber.

6. The fuel mixture distributor as recited in claim 1, wherein the inlet end is spaced a radial distance from the central axis greater than a radial distance of the outlet end.

7. The fuel mixture distributor as recited in claim 1, wherein the air conduit is annular about the central axis.

8. The fuel mixture distributor as recited in claim 1, wherein the mixing chamber converges from the first air inlet in a direction toward the outlet.

9. A combustor assembly for a turbine engine comprising:
a combustor wall defining a combustion chamber; and
a fuel distributor, wherein the fuel distributor includes a mixing chamber disposed about a central axis from a back wall to an outlet to the combustion chamber, a fuel inlet extending into the mixing chamber along the central axis, the fuel inlet including a plurality of fuel openings angled relative to the central axis, a first air inlet including a plurality of first air openings spaced circumferentially apart around the mixing chamber and spaced apart from the fuel inlet, and a second air inlet disposed forward of the fuel openings and the first air inlet, wherein the second air inlet includes an air conduit that extends between an inlet end and an outlet end, the inlet end is spaced a radial distance from the central axis that is greater than a radial distance from the central axis to the outlet end, wherein the outlet end comprises an opening that is disposed parallel to the central axis and opens radially inward into the mixing chamber toward the central axis.

10. The combustor assembly for a turbine engine as recited in claim 9, wherein the plurality of first air openings are each angled relative to an inner surface of the mixing chamber such that airflow through the first air openings introduces a swirling airflow component within the mixing chamber.

11. The combustor assembly for a turbine engine as recited in claim 10, wherein the fuel inlet includes an angled inlet surface and a closed end and the plurality of fuel openings extend through the angled inlet surface.

12. The combustor assembly for a turbine engine as recited in claim 11, wherein the first air openings are disposed at a first axial distance from the back wall, the fuel openings are disposed at a second axial distance from the back wall, and the second air inlet is spaced a third axial distance from the back wall, the second axial distance is greater than the first axial distance and the third axial distance greater than either of the first axial distance or the second axial distance.

13. The combustor assembly for a turbine engine as recited in claim 12, wherein the mixing chamber converges from the first air inlet in a direction toward the outlet.

14. A turbine engine assembly comprising:
a compressor section in flow series with a turbine section;
a combustor assembly including a combustion chamber disposed between the compressor section and the turbine section;
a fuel distributor for introducing a fuel air mixture into the combustion chamber, the fuel distributor including a mixing chamber disposed about a central axis from a back wall to an outlet to the combustion chamber, a fuel inlet extending into the mixing chamber along the central axis, the fuel inlet including a plurality of fuel openings angled relative to the central axis, a first air inlet including a plurality of first air openings spaced circumferentially apart around the mixing chamber and spaced apart from the fuel inlet, and a second air inlet disposed forward of the fuel openings and the first air openings, wherein the second air inlet includes an air conduit that extends between an inlet end and an outlet end, the inlet end is spaced a radial distance from the central axis that is greater than a radial distance from the central axis of the outlet end, wherein the outlet end comprises an opening that is disposed parallel to the central axis and opens radially inward into the mixing chamber toward the central axis; and
a fuel system communicating a fuel in a gaseous phase to the fuel mixture distributor.

15. The turbine engine as recited in claim 14, wherein the plurality of first air openings are each angled relative to an inner surface of the mixing chamber such that airflow through the first air openings introduces a swirling airflow component within the mixing chamber.

16. The turbine engine as recited in claim 15, wherein the fuel inlet includes an angled inlet surface and a closed end and the plurality of fuel openings extend through the angled inlet surface.

17. The turbine engine as recited in claim 16, wherein the mixing chamber converges from the first air inlet in a direction toward the exit opening.

18. The fuel mixture distributor as recited in claim 1, wherein the outlet end of the second air inlet opens into the mixing chamber before the outlet to the combustor.

19. The combustor assembly as recited in claim 9, wherein the outlet end of the second air inlet opens into the mixing chamber before the outlet to the combustor.

20. The turbine engine assembly as recited in claim 14, wherein the outlet end of the second air inlet opens into the mixing chamber before the outlet to the combustor.

* * * * *